(12) United States Patent
Minamikawa (10) Patent No.: US 11,153,451 B2
(45) Date of Patent: Oct. 19, 2021

(54) INFORMATION PROVIDING DEVICE, NON-TRANSITORY COMPUTER-READABLE RECORDING MEDIUM THEREFOR, INFORMATION PROVIDING METHOD AND INFORMATION DISPLAYING DEVICE

(71) Applicant: Brother Kogyo Kabushiki Kaisha, Nagoya (JP)

(72) Inventor: Shunsuke Minamikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/010,889

(22) Filed: Sep. 3, 2020

(65) Prior Publication Data
US 2021/0075925 A1 Mar. 11, 2021

(30) Foreign Application Priority Data

Sep. 6, 2019 (JP) .............................. JP2019-163056

(51) Int. Cl.
*H04N 1/00* (2006.01)
(52) U.S. Cl.
CPC ..... *H04N 1/00506* (2013.01); *H04N 1/00413* (2013.01); *H04N 1/00509* (2013.01); *H04N 2201/0094* (2013.01)
(58) Field of Classification Search
CPC ........... H04N 1/00506; H04N 1/00509; H04N 1/00413; H04N 1/0044; H04N 1/00307; G06F 3/1292
See application file for complete search history.

(56) References Cited

U.S. PATENT DOCUMENTS

2011/0228331 A1   9/2011   Yamada
2020/0125305 A1*  4/2020   Mihira .................... H04L 67/02
2020/0396345 A1* 12/2020   Ito ........................ H04N 1/00424

FOREIGN PATENT DOCUMENTS

JP         2011-197737 A      10/2011

* cited by examiner

*Primary Examiner* — Benjamin O Dulaney
(74) *Attorney, Agent, or Firm* — Burr & Brown, PLLC (57) ABSTRACT

An information providing device having a controller and a communicating part. The controller is configured to generate displaying data and transmit the same to the information displaying device. The displaying data is generated such that a displaying form of the displaying information displayed by the information displaying device is switchable between a first and a second displaying forms, a default displaying form of the displaying information being set to one of the first from and the second form in accordance with setting information arbitrarily set by a user. The first displaying form is configured such that a content area is displayed, and a menu area is not displayed. The menu area includes a plurality of items, the content area includes contents corresponding to at least one of the plurality of items. The second displaying form is configured such that both the menu area and the content area are displayed.

10 Claims, 8 Drawing Sheets

INFORMATION PROVIDING DEVICE, NON-TRANSITORY COMPUTER-READABLE RECORDING MEDIUM THEREFOR, INFORMATION PROVIDING METHOD AND INFORMATION DISPLAYING DEVICE

CROSS-REFERENCE TO RELATED APPLICATIONS

This application claims priority under 35 U.S.C. § 119 from Japanese Patent Application No. 2019-163056 filed on Sep. 6, 2019. The entire subject matter of the application is incorporated herein by reference.

BACKGROUND

Technical Field

The present disclosures relate to an information providing device, a non-transitory computer-readable recording medium therefor, an information providing method and an information displaying device.

Related Art

There has been known a technique of displaying a print dialogue such that, when operation items of the print dialogue overflows from a displayable area of a display screen, the size of the print dialogue is changed in accordance with the size of a displayable area.

SUMMARY

According to the above-described conventional technique, when the displayable area is relatively large, a large size print dialogue is displayed, while, when the display area is relatively narrow (small), a small size print dialogue is displayed.

It is noted, however, some users may prefer to the large size print dialogue, while other uses may prefer to the small size print dialogue. That is, on one side, there may be users who prefer to the small size print dialogue even if the displayable area is large, and on the other side, there may be users who prefer to the large size print dialogue even if the displayable area is relatively narrow. The above-described conventional technique may not match such users' needs.

According to aspects of the present disclosures, there is provided an information providing device having a controller and a communicating part. There controller is configured to perform a generating process of generating displaying data used by an information displaying device to display displaying information and a transmitting process of transmitting the displaying data generated in the generating process to the information displaying device through the communicating part. In the generating process, the controller is configured to generate the displaying data so that a displaying form of the displaying information displayed by the information displaying device is switchable between a first displaying form and a second displaying form, and a default displaying form of the displaying information is set to one of the first from and the second form in accordance with setting information arbitrarily set by a user. The first displaying form is configured such that a content area is displayed, and a menu area is not displayed, the menu area including a plurality of items, the content area including contents corresponding to at least one of the plurality of items. The second displaying form is configured such that both the menu area and the content area are displayed.

According to aspects of the present disclosures, there is provided an information providing method for an image providing device including a controller and a communicating part. The information providing method is to be performed by the controller and includes generating displaying data used by an information displaying device to display displaying information; and transmitting the displaying data as generated to the information displaying device through the communicating part. When the displaying data is generated, the displaying data is generated such that a displaying form of the displaying information displayed by the information displaying device is switchable between a first displaying form and a second displaying form, and a default displaying form of the displaying information is set to one of the first from and the second form in accordance with setting information arbitrarily set by a user. The first displaying form is configured such that a content area is displayed and a menu area is not displayed, the menu area including a plurality of items, the content area including contents corresponding to at least one of the plurality of items. The second displaying form is configured such that both the menu area and the content area are displayed.

According to aspects of the present disclosures, there is provided a non-transitory computer-readable recording medium for an information providing device having a controller a communicating part. The recording medium stores instructions which cause, when executed by the controller, the information providing device to perform a generating process of generating displaying data used by an information displaying device to display displaying information and a transmitting process of transmitting the displaying data generated in the generating process to the information displaying device through the communicating part. In the generating process, the controller is configured to generate the displaying data so that a displaying form of the displaying information displayed by the information displaying device is switchable between a first displaying form and a second displaying form, and a default displaying form of the displaying information is set to one of the first from and the second form in accordance with setting information arbitrarily set by a user. The first displaying form is configured such that a content area is displayed and a menu area is not displayed, the menu area including a plurality of items, the content area including contents corresponding to at least one of the plurality of items. The second displaying form is configured such that both the menu area and the content area are displayed.

According to aspects of the present disclosures, there is provided an information displaying device having a controller, a communicating part and a displaying par. The controller is configured to perform a receiving process of receiving displaying data used to display displaying information through the communicating part and a displaying process of displaying the displaying information on the displaying part based on the displaying data received in the receiving process. In the displaying process, the controller displays the displaying information which is configured such that a displaying form of the displaying information displayed by the information displaying device is switchable between a first displaying form and a second displaying form, and a default displaying form of the displaying information is set to one of the first from and the second form in accordance with setting information arbitrarily set by a user. The first displaying form is configured such that a content area is displayed and a menu area is not displayed, the menu area including a plurality of items, the content area including contents corresponding to at least one of the plurality of items, and the second displaying form is configured such that both the menu area and the content area are displayed.

DETAILED DESCRIPTION OF THE EMBODIMENT

Hereinafter, referring to the accompanying drawings, an information providing device and an information displaying device according to an illustrative embodiment of the present disclosures will be described.

[Information Providing Device and Information Displaying Device]

Figure 1:
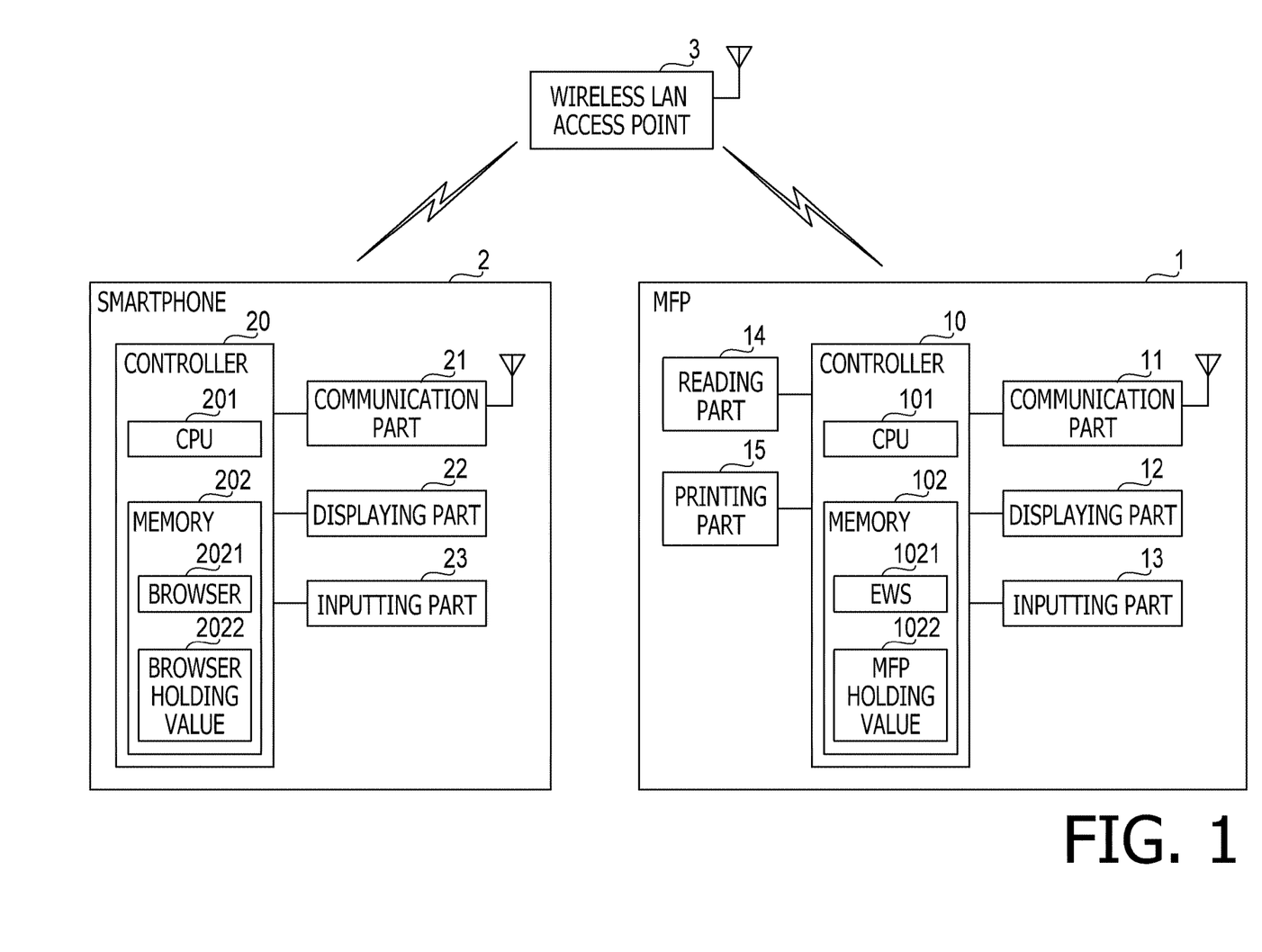
FIG. 1 is a block diagram showing configurations of an information providing device and an information displaying device.

FIG. 1 shows an information providing system according to an illustrative embodiment of the present disclosures. The information providing system includes an MFP (Multi-Function Peripheral) 1 and a smartphone 2. The MFP 1 and the smartphone 2 are configured to communicate with each other through a wireless LAN access point 3.

The MFP 1 includes a controller 10, a communication part 11, a displaying part 12, an inputting part 13, a reading part 14 and a printing part 15. The controller 10 includes a CPU 10 and a memory 102. The CPU 10 is configured to perform processes and controls in accordance with software stored in the memory 102, thereby various functions of the MFP 1 being realized. It should be noted that the functions of the MFP 1 do not need to be limited to ones realized by the CPU 101 and the software. that is, a part of or all of such functions may be realized by one or more pieces of hardware.

The memory 102 includes a semiconductor memory (e.g., a ROM, a RAM, an NVRAM, a flash memory and the like) as a non-transitory tangible recording medium. The memory 102 is configured to store the software and data. According to the present embodiment, the memory 102 is configured to store an EWS (Embedded Web Server) 1021 and MFP holding value. The EWS 1021 is software that makes the MFP 1 operate as a web server and provide a setting screen to make settings of the MFP 1 in response to a request from a client device (e.g., the smartphone 2). The MFP holding value is data set in a process described later and held by the MFP 1 thereafter.

The communication part 11 is provided with a network interface controller conforming to a wireless LAN standard. It is noted that the communication part 11 may be provided with a network interface controller conforming to a wired LAN standard, optionally or alternatively. Further, the communication part 11 may be provided with a communication interface controller conforming to a communication standard (e.g., a USB standard) other than the LAN standard, optionally or alternatively.

The displaying part 12 includes a displaying device (e.g., a liquid crystal display (LCD) or organic electroluminescent display (OELD)) and is configured to display various images. The inputting part 13 includes an inputting device configured to receiving user's inputting operations and an input controller configured to process inputs from the inputting device. According to the present embodiment, the inputting part 13 is provided with a transparent touch panel as the inputting device.

The reading part 14 has a one-dimensional (i.e., linear) image sensor provided with a plurality of reading elements linearly arranged in one direction (i.e., in a main scanning direction). The reading part 14 is configured to read an image on an original which is supported on a transparent platen by moving the image sensor in a direction (i.e., an auxiliary scanning direction) perpendicular to the main scanning direction which is an arranging direction of the reading elements. The reading part 14 is also configured to read an image on an original which is conveyed, relative to the image sensor, by an ADF (Automatic Document Feeder).

The printing part 15 is configured to form an image on a sheet-type printing medium. According to the present embodiment, the printing part 15 is provided with an inkjet type printing mechanism. It is noted that the printing part 15 does not need to be limited to be of the inkjet printing mechanism, but may be configured to print an image in accordance with any other known printing method (e.g., the electrophotographic imaging method).

The smartphone 2 has a controller 20, a communication part 21, a displaying part 22 and an inputting part 23. The controller 20 is provided with a CPU 201 and a memory 202. The CPU 201 is configured to perform processes and controls in accordance with software stored in the memory 202, thereby respective functions of the smartphone 2 being realized. It should be noted, however, the functions of the smartphone 2 do not need to be limited to ones realized by the CPU 201 and the software, but a part of or all of the functions may be realized by one or multiple pieces of hardware.

The memory 202 includes a semiconductor memory (e.g., a ROM, a RAM, an NVRAM, a flash memory or the like) which is a non-transitory tangible recording medium. According to the present embodiment, the memory 202 stores a browser 2021 and a browser holding value 2022. The browser 2021 is software having a function of browsing web pages supplied by web servers. According to the present embodiment, the browser 2021 is used when a web page (displaying a setting screen for the MFP 1) supplied by the EWS 1021 provided to the MFP 1 is displayed by the smartphone 2. The browser holding value 2022 is data, which is set during a process described later and held by the smartphone 2 thereafter.

The communication part 21 is provided with a network interface controller conforming to the wireless LAN standard. It is noted that the communication part 21 may be provided with a network interface controller conforming to a wired LAN standard. Alternatively or optionally, the communication part 21 may be configured to a communication interface conforming to a communication standard other than the LAN standard (e.g., a USB standard).

The displaying part 22 is provided with a displaying device (e.g., an LCD or an organic EL display) and configured to display various images. The input part 23 is provided with an inputting device configured to receive various inputting operations and an input controller configured to process input from the inputting device. The inputting part 23 of the present embodiment has a transparent touch panel which serves as the inputting device. The touch panel is arranged to be overlaid on a displaying device of the displaying part 22.

The wireless LAN access point 3 is a device relaying a wireless communication between the MFP 1 and the smartphone 2.

[Setting Screen to Set MFP]

Next, a setting screen to make setting of the MFP 1 will be described.

Figure 2A:
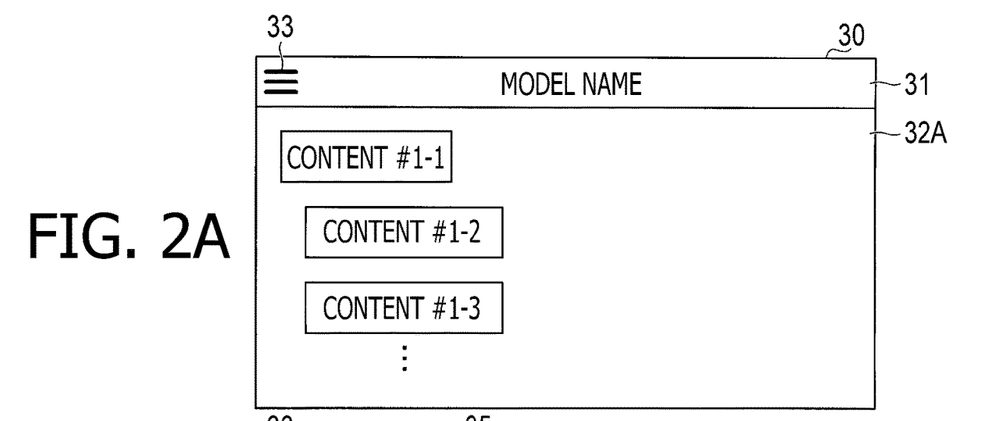
FIG. 2A shows a display example 1 according to a first displaying form.

The MFP 1 is configured to provide a setting screen to perform setting of the MFP 1 to a client device on the network with use of the EWS 1021. FIG. 2A shows an example of a setting screen 30. When a user inputs a particular URL through the browser 2021 of the smartphone 2, the setting screen 30 is provided from the MFP 1 to the smartphone 2, and is displayed by the smartphone 2. As will be describe in detail, the setting screen 30 shown in FIG. 2A is a screen displayed in the first displaying form, which will be describe later.

In an initial state immediately after the setting screen30 is displayed, the setting screen 30 is configured to include a header area 31 and a content area 32A. On a left end part of the header area 31, a menu button 33 is displayed. At a central portion of the header area 31, a model name of the MFP 1 is indicated. In the content area 32A, text objects or image objects such as a content #1-1, a content #1-2, a content #1-3, and the like are displayed. Examples of the text object include indexes of setting items, selectable options, descriptions and the like. Example of the image objects include an image indicating a remaining amount of the ink, images of buttons subjected to be operated and the like.

Figure 2B:
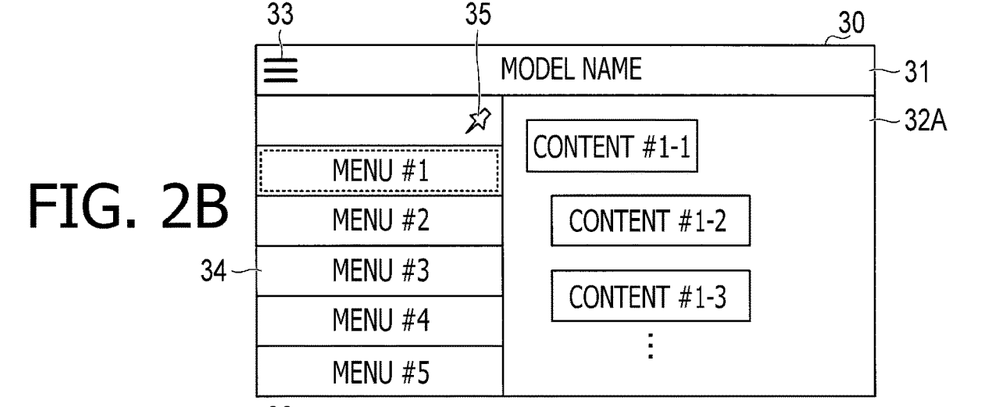
FIG. 2B shows a display example 2 according to the first displaying form.

When the setting screen 30 is being displayed by the smartphone 2, if the menu button 33 is tapped, a menu area 34 is developed rightward from the left end of the screen. When the menu screen 34 is developed, the content area 32A is shifted rightward by an amount corresponding to a width of the menu area 34. When the setting screen 30 is displayed by the PC, by pointing the menu button 33 with a pointer (e.g., a mouse cursor) and performing a clicking operation of the pointing device (e.g., a mouse), the menu area 34 is developed. Differences of operation method depending on the inputting device as above are well known. Therefore, in the following description, the operation of the smartphone 2 will be mainly described, while description on the operation of the PC will be omitted.

Figure 2C:
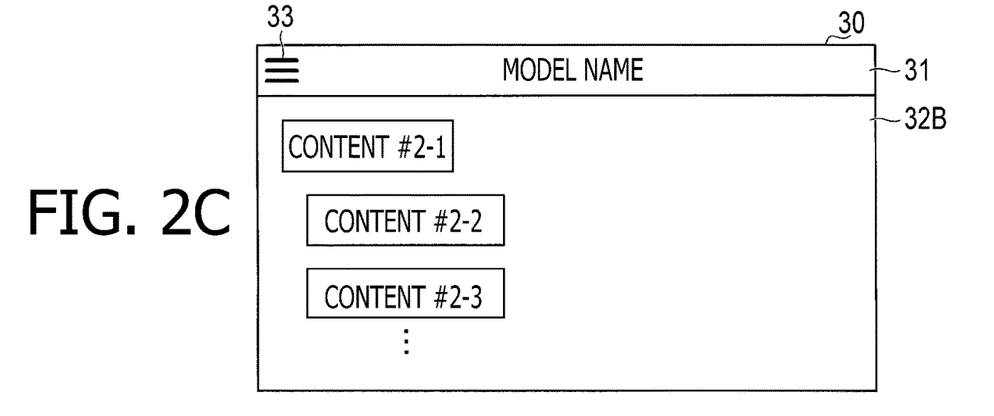
FIG. 2C shows a display example 3 according to the first displaying form.

On an upper right part of the menu area 34, a pinning button 35 is displayed. Further, in the menu area 34, text objects or image objects such as menu #1, menu #2, menu #3, menu #4, menu #5 and the like are displayed. According to the present embodiment, the content area 32A includes contents corresponding to the menu #1. When the user taps the menu #2 in a state where the menu #1 is being selected, a content area 32B is displayed instead of the content area 32A as shown in FIG. 2C.

The content area 32B includes contents corresponding to the menu #2. When the content area 32B is displayed, in association with the content area 32B being displayed, the menu 34 is folded leftward. Thus, the menu area 34 is automatically extinguished from the screen.

When the setting screen 30 is displayed by a device having a relatively large displaying area (e.g., a PC, a tablet or the like), as shown in FIG. 2B, the menu area 34 and the content area 32A can be displayed at the same time. When the setting screen 30 is displayed by a device having a relatively small displaying area (e.g., the smartphone 2), as shown in FIGS. 3A-3D, displayed states of respective areas could be changed.

Figure 3A:
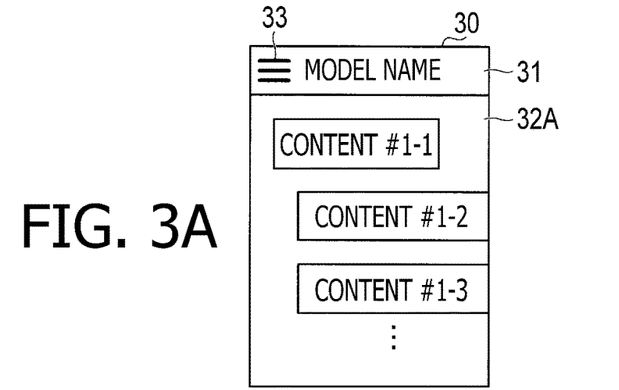
FIG. 3A shows a display example 4 according to the first displaying form.
Figure 3B:
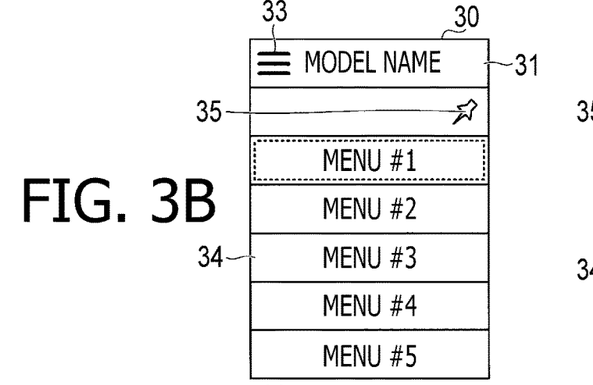
FIG. 3B shows a display example 5 according to the first displaying form.

As shown in FIG. 3A, for example, the content area 32A is in a state where a part of the area, which existed as a right portion of the area, overflows from the screen and is not displayed within the content area 32A. When the user taps the menu button 33 in this state, the menu area 34 is developed as shown in FIG. 3B. In such a case, the content area 32A shifts rightward by an amount corresponding to a width of the menu area 34, and the content area 32A completely overflows out of the screen.

Figure 3C:
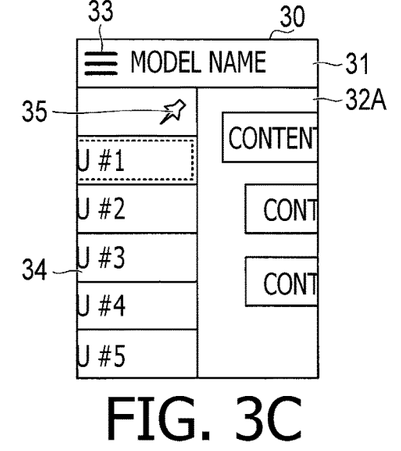
FIG. 3C shows a display example 6 according to the first displaying form.
Figure 3D:
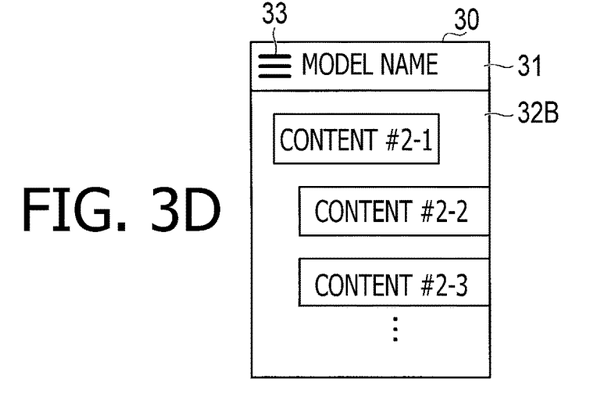
FIG. 3D shows a display example 7 according to the first displaying form.

When the user wishes to view the content area 32A which overflows from the screen, the user can shift back the content area 32A, which overflows rightward from the screen, leftward as shown in FIG. 3C by performing a flicking operation, on the screen, from the right side toward the left side. Further, when the user taps the menu #2, for example, in the state shown in FIG. 3C, a content area 32B is displayed instead of the content area 32A as shown in FIG. 3D. At this stage, in association with displaying of the content area 32B, the menu area 34 is folded toward the left end.

Figure 4A:
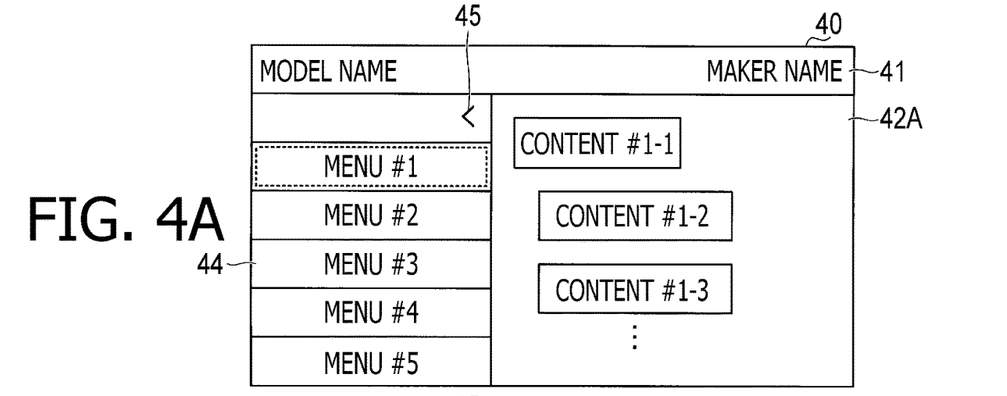
FIG. 4A shows a display example 1 according to a second displaying form.

In a state where the menu area 34 is displayed as shown in FIG. 2B, when the user taps the pinning button 35, a displaying form is changed from a first displaying form to a second displaying form and a setting screen 40 as shown in FIG. 4A is displayed.

The setting screen 40 includes a header area 41, a content area 42A and a menu area 44. On a left end of the header area 41, a model name of the MFP 1 is indicated. On a right end part of the header area 41, a maker of the MFP 1 is indicated. In the content area 42A, text objects or image objects such as a content #1-1, a content #1-2, a content #1-3, and the like are displayed. Examples of the text object include indexes of setting items, selectable options or descriptions. Examples of the image object include an image indicating a remaining amount of the ink, image of buttons subjected to be operated or the like.

Figure 4B:
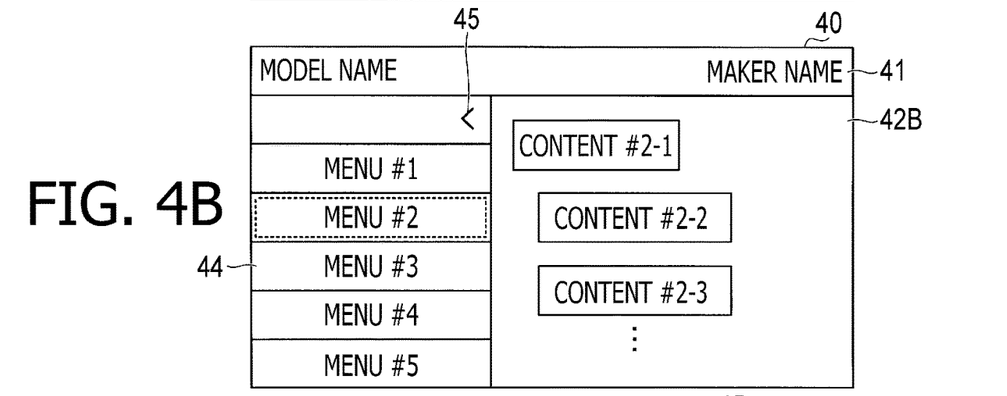
FIG. 4B shows a display example 2 according to the second displaying form.

On an upper right part of the menu area 44, a folding button 45 is displayed. Further, in the menu area 44, text objects or image objects such as menu #1, menu #2, menu #3, menu #4, menu #5 and the like are displayed. According to the present embodiment, the content area 42A includes contents corresponding to the menu #1. When the user taps the menu #2 in the state shown in FIG. 4A, a content area 42B is displayed instead of the content area 42A as shown in FIG. 4B.

Figure 4C:
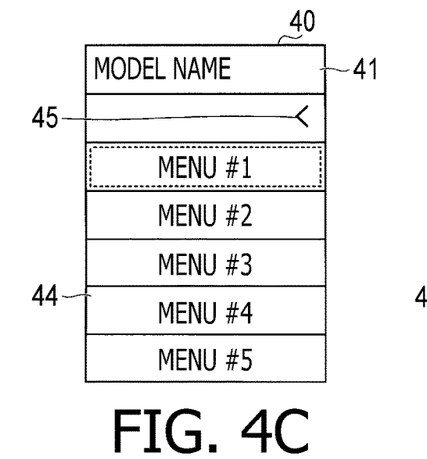
FIG. 4C shows a display example 3 according to the second displaying form.

The content area 42B includes contents corresponding to the menu #2. It is noted that, when the content area 42B is displayed, the displayed state of the menu area 44 is maintained. In this respect, the second displaying form is different from the first displaying form shown in FIGS. 2A-3D. That is, in the setting screen 40 corresponding to the second displaying form, a state where the menu area 44 is always displayed is maintained. It is noted, however, when the setting screen 40 is displayed by a device having a relatively small displaying area (e.g., the smartphone 2), the menu area 44 may be displayed on the entire screen and the content area 42A may overflow from the screen 40 as shown in FIG. 4C.

Figure 4D:
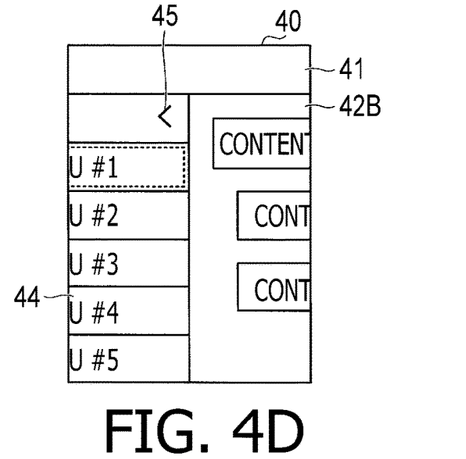
FIG. 4D shows a display example 4 according to the second displaying form.

When the user wants to review the content area 42A overflown from the screen 40 (see FIG. 4C), by performing a flicking operation, on the screen, from the right side toward left side, the content area 42A overflown rightward from the screen 40 can be shifted leftward as shown in FIG. 4D.

When the user taps the folding button 45 in a state where the menu area 44 is being displayed, the displaying form of the setting screen is changed from the second displaying form to the first displaying form and the setting screen 30 as shown in FIG. 2A is displayed. That is, according to the present embodiment, by operating the pinning button 35 and the folding button 45, the displaying form of the setting screen can be changed from one of the first displaying form and the second displaying form to the other of the first displaying form and the second displaying form.

[Details of Setting Screen Displaying Process]

Figure 5A:
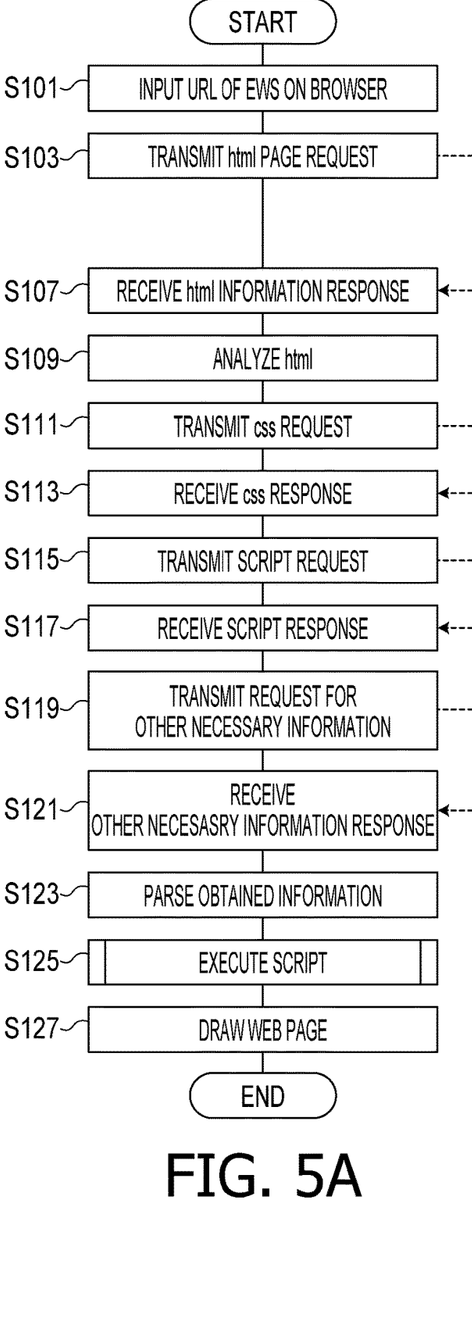
FIG. 5A is a flowchart illustrating an information provided process.
Figure 5B:
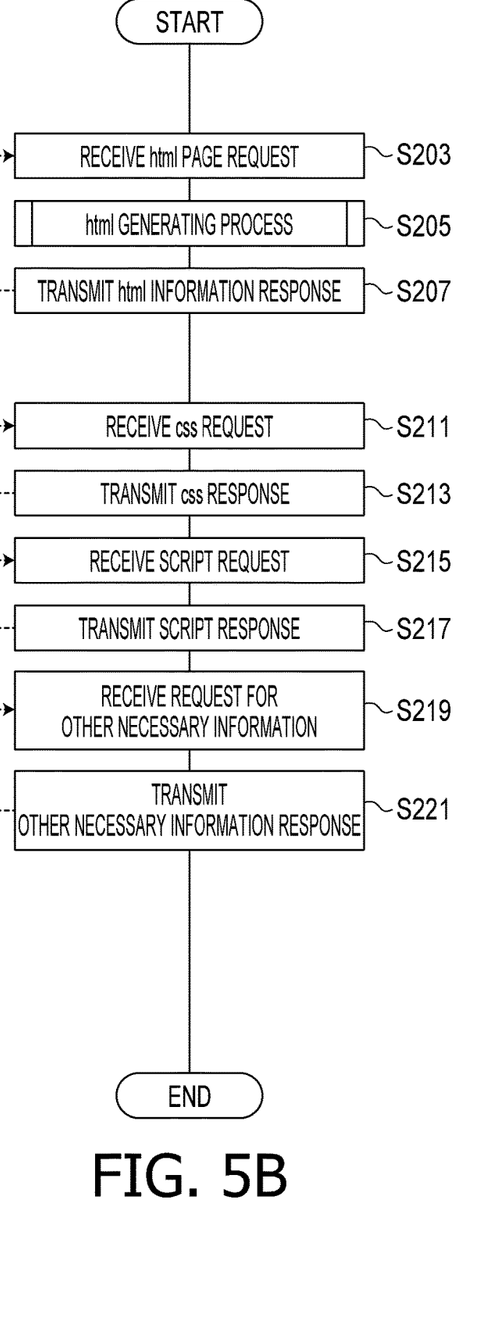
FIG. 5B is a flowchart illustrating an information displaying process.

Processes to be executed by the MFP 1 and the smartphone 2 to display the above-mentioned setting screen will be described. A flowchart in FIG. 5A shows a process performed by the smartphone 2, while a flowchart in FIG. 5B shows a process performed by the MFP 1. When the user inputs the URL of the EWS 1021 through the browser 2021 on the smartphone 2 (S101), the smartphone 2 transmits an html page request to the MFP 1 (S103). In response to receipt of the html page request from the smartphone 2 (S203), the MFP 1 performs an html generating process (S205).

Figure 6:
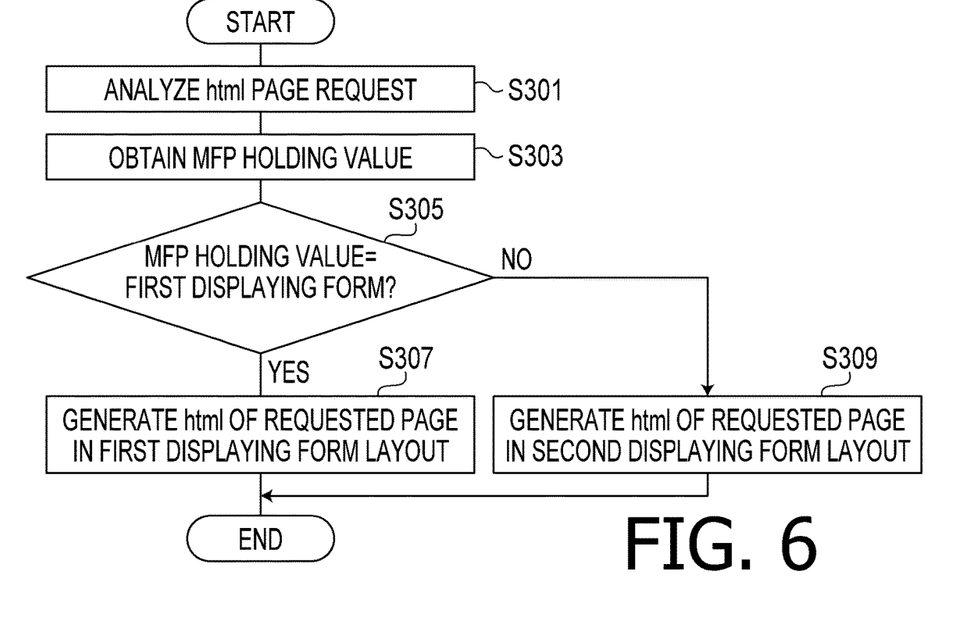
FIG. 6 is a flowchart illustrating an html page generating process.

FIG. 6 is a flowchart illustrating the html generating process. When the html generating process is started, the MFP 1 analyzes the html page request (S301). Next, the MFP 1 obtains the MFP holding value 1022 regarding the layout setting stored in the memory 102 (S303). The user arbitrarily sets which of the setting screen 30 according to the first displaying form and the setting screen 40 according to the second displaying form is to be displayed, and the MFP holding value 1022 is the data representing the setting content above.

The MFP determines whether the MFP holding value 1022 is set to represent the first displaying form (S305). When it is determined that the MFP holding value 1022 is set to represent the first displaying form (S305: YES), the MFP 1 generates the html of the request page in accordance with the layout of the first displaying form (S307) and terminates the html generating process. When, on the other hand, it is determined that the MFP holding value 1022 is not set to represent the first displaying form (S305: NO), the MFP 1 generates the html of the request page in accordance with the layout of the second displaying form (S309) and terminates the html generating process.

After terminating the html generating process (see FIG. 6) at S205 of FIG. 5, the MFP 1 transmits html information as a response to the smartphone 2 (S207). The smartphone 2 receives the html information as the response from the MFP 1 (S107). Thus, the smartphone 2 obtains information corresponding to a basic configuration of a web page subjected to display. Next, the smartphone 2 analyzes the received html information (S109), and transmits a css request to the MFP 1 based on the analysis result (S111).

The MFP 1 receives the css request from the smartphone 2 (S211) and transmits the css response to the smartphone 2 (S213). The smartphone 2 receives the css response from the MFP 1 (S113). Thus, the smartphone 2 obtains information regarding color and size of the font of the web page subjected to display (S115).

The MFP 1 receives a script request from the smartphone 2 (S215), and transmits a script response to the smartphone 2 (S217). The smartphone 2 receives the script response from the MFP 1 (S117). As above, when a layout is dynamically changed in accordance with a user operation in a web page subjected to display, the smartphone 2 obtains software to be executed by the smartphone 2.

Next, the smartphone 2 transmits a request for other necessary information to the MFP 1 (S119). The MFP 1 receives the request for the other necessary information from the smartphone 2 (S219) and transmits a response regarding the other necessary information to the smartphone 2 (S221). The smartphone 2 receives a response regarding the other necessary information from the MFP 1 (S121).

Figure 7:
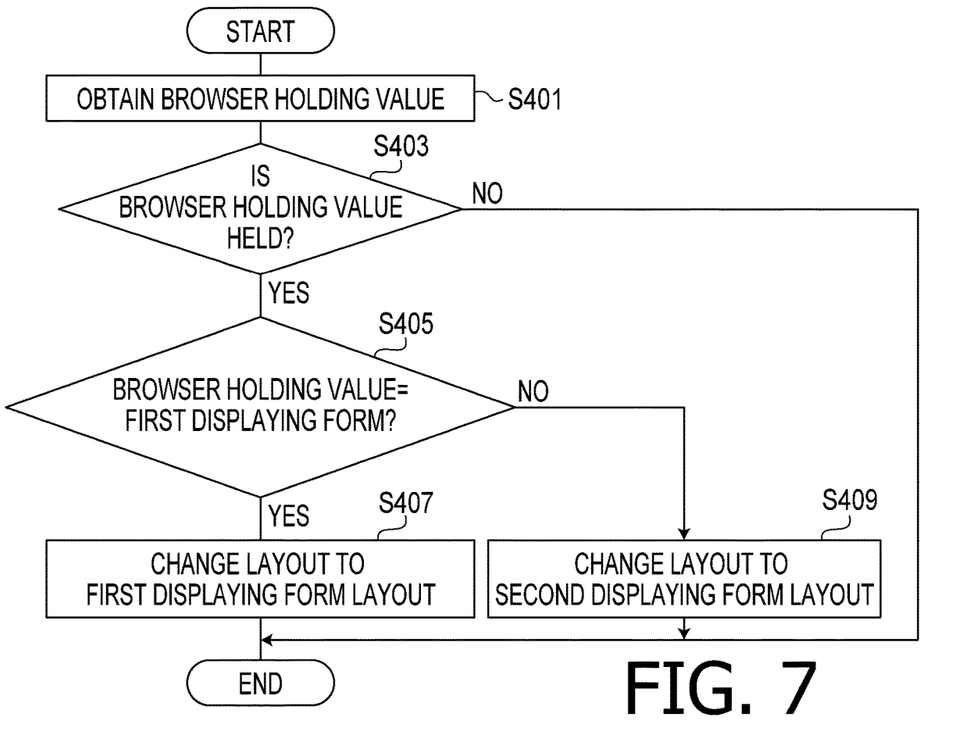
FIG. 7 is a flowchart illustrating a display layout updating script.

Next, the smartphone 2 parses obtained information (S123) and executes the script (S125). FIG. 7 shows details of the process of S125. When the script is started, the smartphone 2 obtains the browser holding value 2022 (S401). The user arbitrarily sets which of the setting screen 30 in accordance with the first displaying form and the setting screen 40 in accordance with the second displaying form is displayed, and the browser holding value 2022 is the data representing the set content. The present embodiment is configured such that the browser holding value 2022 is held as "cookie" which is one of various pieces of information used by the browser 2021.

Then, the smartphone 2 determines whether the browser holding value 2022 is held (S403). It is noted that there may be or may not be a case where the browser holding value 2022 is held. Accordingly, it is uncertain whether an effective browser holding value 2022 is obtained in S401. Therefore, in S403, it is judged whether the effective browser holding value 2022 is obtained.

When it is determined that the browser holding value 2022 is not held (S403: NO), the smartphone 2 terminates the script. When it is determined, on the other hand, that the browser holding value 2022 is held (S403: YES), the smartphone 2 determines whether the browser holding value 2022 is set to the first displaying form (S405). When it is determined that the browser holding value is set to represent the first displaying form (S405: YES), the smartphone 2 changes the layout of the web page to the first displaying form in S407, and terminates the script. When it is determined that the browser holding value 2022 is not set to represent the first displaying form (S405: NO), the smartphone 2 changes the layout of the web page to the second displaying form (S409) and terminates the script.

When the smartphone 2 executes one of S403, S407 and S409 and terminates the script, the smartphone 2 terminates S125 of FIG. 5 and executes S127, where the smartphone 2 draws a web page (S127). Then, on the displaying area 22 of the smartphone 2, the setting window 30 according to the first displaying form or the setting window 40 according to the second displaying form is displayed. In S127, which of the setting screen 30 and the setting screen 40 is displayed depends on a combination of determination results in S305, S403 and S405.

Concretely, when it is determined that the browser holding value 2022 is not held (S403: NO), the determination result in S305 becomes effective. That is, when it is determined that the MFP holding value 1022 is set to represent the first displaying form (S305: YES), the web page having a layout in accordance with the first displaying form (i.e., the setting screen 30) which is generated in S307 is displayed in S127. When it is determined that the MFP holding value 1022 is not set to represent the first displaying form (S305: NO), the web page having a layout in accordance with the second displaying form (i.e., the setting screen 40) which is generated in S309 is displayed in S127.

When it is determined that the browser holding value 2022 is held (S403: YES), the decision result in S405 becomes effective. That is, when it is determined that the browser holding value 2022 is set to represent the first displaying form (S405: YES), the web page of which layout is changed to the layout according to the first displaying form (i.e., the setting screen 30) in S407 is displayed in S127. When it is determined that the browser holding value 2022 is not set to represent the first displaying form (S405: NO), the web page of which layout is changed to the layout according to the second displaying form (i.e., the setting screen 40) in S409 is displayed in S127.

Thus, according to the present embodiment, as far as the browser holding value 2022 is held, the web page is displayed in accordance with the browser holding value 2022 regardless of the setting of the MFP holding value 1022. Further, when the browser holding value 2022 is not held, the web page is displayed in accordance with the MFP holding value 1022.

[MFP Holding Value Setting Process]

Figure 8:
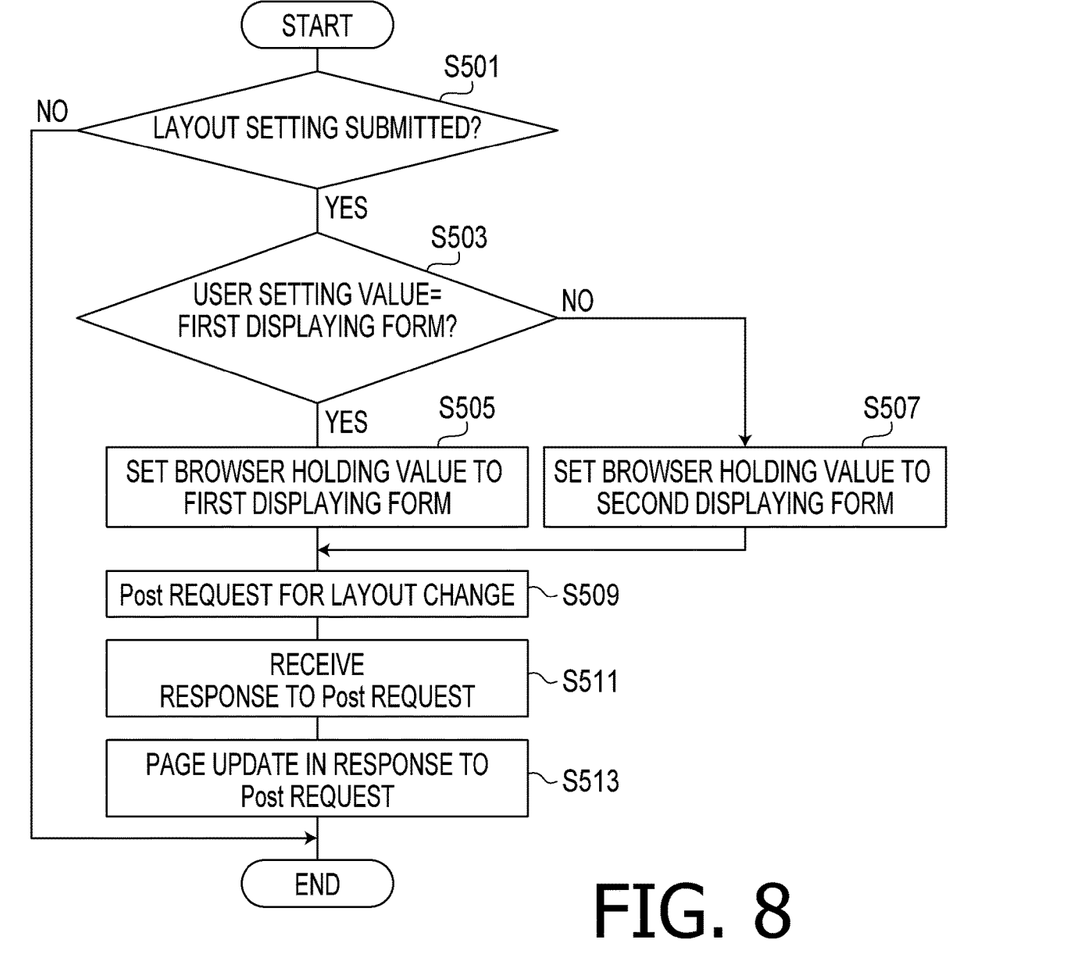
FIG. 8 is a flowchart illustrating a process in the information displaying device when an MFP holding value is changed.
Figure 9:
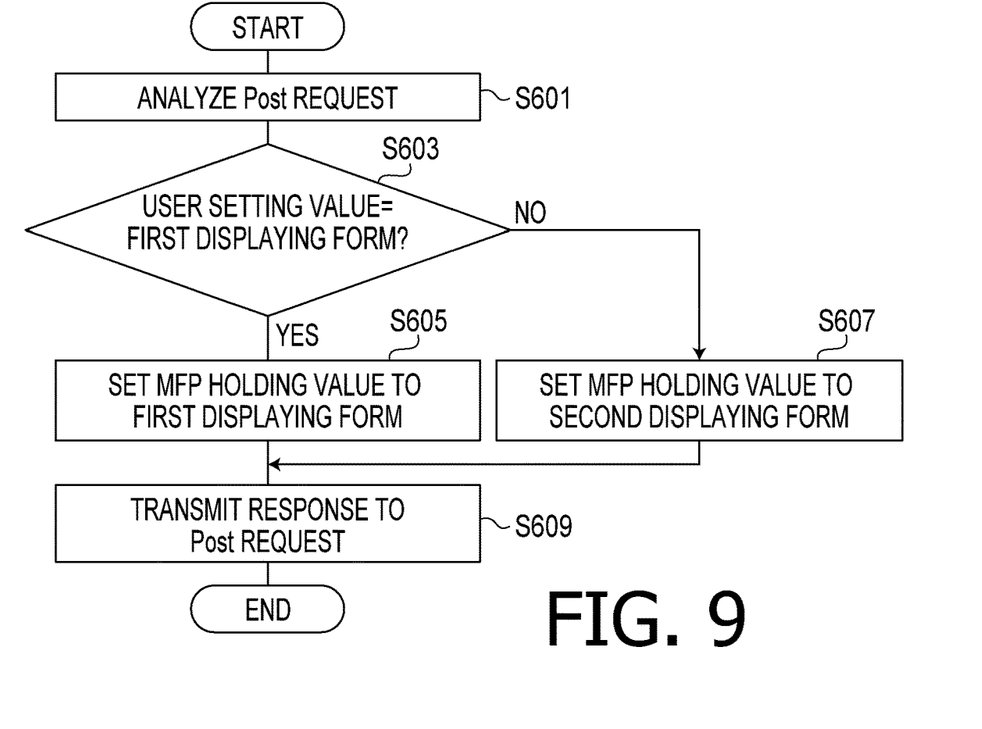
FIG. 9 is a flowchart illustrating a process in the information displaying device when an MFP holding value is changed.

Next, a process which is performed in the MFP 1 and the smartphone 2 when the MFP holding value is set will be described. FIG. 8 shows a process performed in the smartphone 2 and FIG. 9 shows a process performed in the MFP 1.

Figure 10:
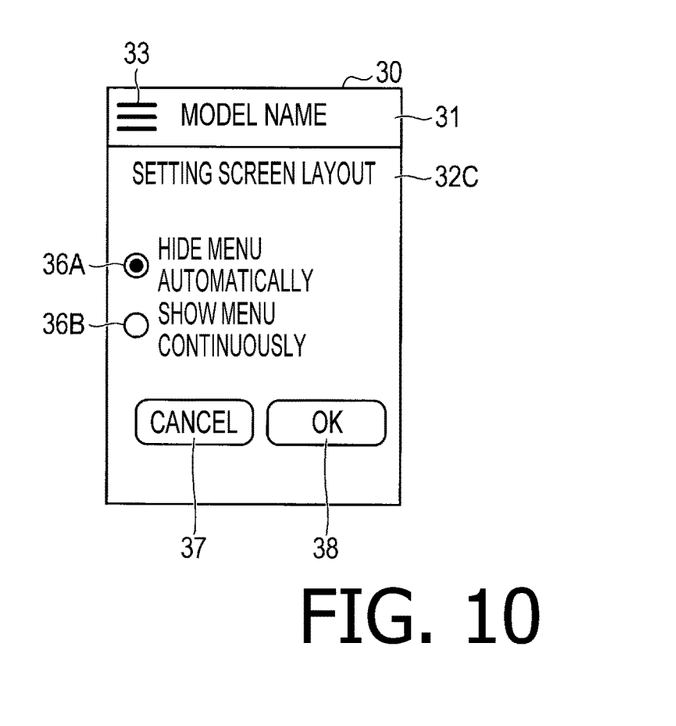
FIG. 10 shows an example of a setting screen to change a layout of a setting screen.

The process shown in FIG. 8 is performed when the user makes operations on the browser 2021 on the smartphone 2 to display the setting screen 30 regarding the "layout of the setting screen" as shown in FIG. 10, selects one of radio buttons 36A and 36B, and taps a cancel button 37 or an OK button 38.

When the MFP holding value setting process (FIG. 8) is started, the smartphone 2 determines whether a user operation of a submission instruction of the layout setting is received (S501). In S501, when the OK button 38 is tapped, the smartphone 2 determines that the submission instruction is received (S501: YES), while when the cancel button 37 is tapped, the smartphone 2 determines that the submission instruction is not received (S501: NO). When it is determined that the submission instruction is not received (S501: NO), the smartphone 2 terminates the MFP holding value setting process.

When it is determined that the submission instruction is received (S501: YES), the smartphone 2 determines whether the first displaying form is selected as the user setting value (S503). In S503, when the radio button 36A is selected, it is determined that the first displaying form is selected as the user setting value, while when the radio button 36B is selected, it is determined that the first displaying form is not selected as the user setting value.

When it is determined that the first displaying form is selected (S503: YES), the smartphone 2 sets the browser holding value 2022 to represent the first displaying form (S505). When it is determined that the first displaying form is not selected (S503: NO), the smartphone 2 sets the browser holding value 2022 to represent the second displaying form (S507). After executing S505 or S507, the smartphone 2 transmits a Post request regarding the change of the layout to the MFP 1 (S509).

At this stage, as shown in FIG. 9, the MFP 1 receives the Post request, and performs analyzing of the received Post request (S601). Next, based on the analysis result, the MFP 1 determines whether the first displaying form is selected as the user setting value in the smartphone 2 (S603). When it is determined that the first displaying form is selected (S603: YES), the MFP 1 sets the MFP holding value 1022 to represent the first displaying form (S605). When it is determined that the first displaying form is not selected (S603: NO), the MFP 1 sets the MFP holding value 1022 to represent the second displaying form (S607).

After executing S605 or S607, the MFP 1 transmits a response to the Post request to the smartphone 2 (S609) and terminates the process shown in FIG. 9. As shown in FIG. 8, in S511, the smartphone 2 receives the response to the Post request (i.e., the response transmitted by the MFP 1 in S609 of FIG. 9) and performs page update corresponding to the Post (S513). After executing S513, the smartphone 2 terminates the process shown in FIG. 8.

[Effects]

According to the MFP 1 described above, an html page configured such that the displaying form of the setting screen is switchable between the first displaying form and the second displaying form, and the default displaying form of the setting screen is set to one of the first displaying form and the second displaying form in accordance with the MFP holding value 1022 or the browser holding value 2022 which is arbitrarily set by the user is generated.

Accordingly, by setting the MFP holding value 1022 or the browser holding value 2022 so that one of the first displaying form and the second displaying form is used as the default displaying form in advance, it becomes possible to display the setting screen in accordance with the displaying form corresponding to the MFP holding value 1022 or the browser holding value 2022 which is set in advance.

According to the above-described configuration, different from the conventional technique in which the displaying form is determined based on the type of the information displaying device (e.g., the PC, the tablet, the smartphone and the like) or the screen size of the displaying part of the information displaying device, a user-desired displaying form, which is set by the user in advance, can be used to display the setting screen regardless of the type of the information displaying device or the screen size of the display part of the information displaying device.

When, for example, information necessary for the user is included on the content area 32A which is displayed in the first displaying form, by setting the setting information so that the first displaying form is the default displaying form, it becomes possible not to display the menu area 34 which is unnecessary for the user. Further, when information necessary for the user is displayed in the content aera 42B when the user operation is performed in the menu area 44, by setting the setting information so that the second displaying form is the default displaying form, it becomes possible to display the menu area 44 which is necessary for the user.

The present embodiment is configured such that, on the setting screen 30 according to the first displaying form, after the displaying process is performed in the displaying form in which the content area 32A is displayed and the menu are 34 is not displayed, and when an operation to tap the menu button 33 is performed, the displaying form is changed to one in which the menu area 34 is displayed. Accordingly, a user who is not normally necessary to operate in the menu area 34 can make the menu area 34 be displayed and perform a desired operation.

Further, according to the present embodiment, the process shown in FIG. 7 is performed in accordance with the script supplied from the MFP 1 and the displaying form of the setting screen is changed to a displaying form according to the browser holding value 2022. Therefore, even if the MFP holding value 1022 is changed, for example, by a third person, when the browse holding value 2022 is held by the smartphone 2, the user of the smartphone 2 can make the setting screen displayed in accordance with the user-desired displaying form.

It is noted that the MFP 1 is an example of an information providing device, and the smartphone 2 is an example of an information displaying device. The CPU 101 is an example of a controller of the information processing device. The processes from S203 to S221 correspond to an example of a generating process and transmitting process. The MFP holding value 1022 and the browser holding value 2022 correspond to an example of setting information arbitrarily set by the user. The memory 102 and the memory 202 correspond to an example of a storage.

[Other Embodiments]

It is noted that the above-described embodiment is only an illustrative embodiment according to aspects of the present disclosures. That is, aspects of the present disclosures should not be limited to the configuration of the above-described embodiment, but various modifications of the above-described embodiment can be realized without departing from the aspects of the present disclosures.

In the above-described embodiment, when the MFP 1 provides the smartphone 2 with a script and the smartphone 2 executes the script, the browser holding value 2022 is held by the smartphone 2. The configuration may be modified such that the browser holding value 200 is used by the MFP 1. Concretely, when the smartphone 2 transmits the html page request in S103, the browser holding value 2022 may be transmitted to the MFP 1. On the MFP 1 side, it is determined whether the browser holding value 2022 is received in S205 and S307 or S309 is executed depending on the result of determination in S205. According to such a configuration, when the information is received in S107, the smartphone 2 can receive the html information reflecting the settings of the browser holding value 2022. Thus, S125 can be omitted. That is, a time period after execution of S123 to start of S127 can be shortened.

According to the above embodiment, both the MFP holding value 1022 and the browser holding value 2022 are used. The configuration may be modified such that only one of the MFP holding value 1022 and the browser holding value 2022 is employed.

It is noted that multiple functions realized by one component in the above-described embodiment may be realized by multiple components and/or a function realized by a single component in the above-described embodiment may be realized by multiple components. Further, multiple functions realized by multiple components in the above-described embodiment may be realized by a single component and/or a single function realized by multiple components in the above-described embodiment may be realized by a single component. Still further, a part of the configuration according to the above-described embodiment may be omitted.

[Supplementary Description]

It is noted that, according to aspects of the present disclosures, the information providing device may further be provided with configurations indicated below.

(A) The displaying form may be modified such that displaying is made with the content area being displayed while the menu area being not displayed, and then, after a particular operation is performed on the information displaying device, the displaying form is changed to one in which the menu area is displayed.

According to the information providing device configured as above, when the particular operation is performed on the information displaying device, the menu area is displayed. Thus, the user who normally does not operate in the menu area can make the menu area be displayed an perform a desired operation in the menu area when necessary.

(B) The information providing device may include a storing part. The storing part may be configured to store the setting information. In the generating process, the display data may be generated such that the default displaying form for the display information is one of the first displaying form and the second displaying form in accordance with the setting information.

According to the information providing device configured as above, it is possible to generate the displaying data in accordance with the setting information stored in the storing part provided to the information providing device.

(C) It is noted that the information displaying device may store the setting information. In the generating process, the displaying data containing a display controlling script to be executed by the information displaying device when the displaying information is displayed may be generated. Further, the display controlling script may include a script which controls the information displaying device such that the information displaying device displays the displaying information according to one the first displaying form and the second displaying form.

According to the information providing device configured as above, when the displaying information is generated by the information displaying device, the displaying data containing the display controlling script which is executed by the information displaying device when the displaying information is displayed by the information displaying device is generated. The displaying data is transmitted, via the communication part, to the information displaying device in the transmitting process. The information displaying device displays the displaying information based on the displaying data received from the information providing device. At that stage, when the information displaying device performs a process in accordance with the display controlling script, the information displaying device displays the displaying information in accordance with one of the first displaying form and the second displaying form based on the setting information.

Accordingly, when the user sets setting information so that one of the first displaying form and the second displaying form is the default displaying form in advance, the displaying information can be displayed in the displaying form corresponding to the setting information set in advance when the displaying information is displayed by the information displaying device.

(D) The displaying information may contain an input screen which is used when the setting information stored in the storing part is to be changed. In the generating process, when information regarding a change of the setting information input through the input screen is transmitted from the information displaying device to the information processing device, the displaying data containing information transmitting script toe be executed by the information displaying device may be generated. The information transmitting script may contain a script which controls the information displaying device such that the information regarding the change of the setting information is transmitted from the information displaying device to the information providing device and the setting information stored in the information displaying device is changed. The controller may be configured such that a changing process of changing the setting information stored in the storing part is executable when the information regarding the change of the setting information is received from the information displaying device.

According to the information providing device configured as above, in response to input on the information displaying device side, the setting information stored in the storing part and the setting information stored in the information displaying device can be chanted to the same content.

(E) The setting information may be stored in the information displaying device. The generating process may be modified such that the setting information transmitted from the information displaying device is received and the displaying form of the displaying data is set to one of the first displaying form and the second displaying form in accordance with the received setting information.

According to the information providing device configured as above, the setting information can be transmitted from the information displaying device to the information providing device, and the displaying data configured to be displayed in the displaying form according to the setting information can be generated.

(F) The setting information may be stored in the information displaying device. In the generating process, the displaying data containing a display controlling script which is executed by the information displaying device when the displaying information is displayed may be generated. The display controlling script may contain a controlling script configured such that the information displaying device displays the displaying information in accordance with one of the first displaying form and the second displaying form based on the setting information stored in the information displaying device.

According to the information providing device configured as above, the displaying data containing the display controlling script to be executed by the information displaying device when the information displaying device displays the displaying information is generated in the generating process. The displaying data is transmitted, in the transmitting process, to the information displaying device via the communicating part. The information displaying device displays the displaying information based on the displaying data received from the information providing device. At that stage, when the information displaying device executes a process according to the display controlling script, the information displaying device displays the displaying information in accordance with one of the first displaying form and the second displaying form based on the setting information.

Accordingly, when the user sets setting information so that one of the first displaying form and the second displaying form is the default displaying form in advance, the displaying information can be displayed in the displaying form corresponding to the setting information set in advance when the displaying information is displayed by the information displaying device.

What is claimed is:

1. An information providing device, comprising:
   a controller; and
   a communicating part,
   wherein the controller is configured to perform:
     a generating process of generating displaying data used by an information displaying device to display displaying information; and
     a transmitting process of transmitting the displaying data generated in the generating process to the information displaying device through the communicating part,
   wherein, in the generating process, the controller is configured to generate the displaying data so that a displaying form of the displaying information displayed by the information displaying device is switchable between a first displaying form and a second displaying form, and a default displaying form of the displaying information is set to one of the first form and the second form in accordance with setting information arbitrarily set by a user,
   wherein the first displaying form is configured such that a content area is displayed and a menu area is not displayed, the menu area including a plurality of items, the content area including contents corresponding to at least one of the plurality of items, and
   wherein the second displaying form is configured such that both the menu area and the content area are displayed.

2. The information providing device according to claim 1, wherein the first displaying form is configured such that, after display is performed in a displaying form in which the content area is displayed and the menu area is not displayed, the displaying form is changed to a displaying form in which the menu area is displayed when a particular operation is performed on the image displaying device.

3. The information providing device according to claim 1, further comprising a storing part,
   wherein the storing part is configured to store the setting information, and
   wherein the displaying data is generated in the generating process such that a default displaying form for the displaying information is one of the first displaying form and the second displaying form in accordance with the setting information stored in the storing part.

4. The information providing device according to claim 3,
   wherein the setting information is stored in the information displaying device,
   wherein the displaying data containing a display controlling script to be executed by the information displaying device when the displaying information is displayed is generated in the generating process, and
   wherein the display controlling script includes a script controlling the information displaying device such that the information displaying device displays the displaying information in accordance with one of the first displaying form and the second displaying form.

5. The information providing device according to claim 4,
wherein an input screen used to perform a setting change on the setting information stored in the storing part is included in the displaying information,
wherein, in the generating process, the displaying data including information transmitting script which is executed by the information displaying device when information regarding the setting change of the setting information input through the input screen is transmitted from the information displaying device to the information providing device is generated,
wherein the information transmitting script includes a script controlling the information displaying device such that the information regarding the setting change of the setting information is transmitted from the information displaying device to the information providing device and the setting information stored in the information displaying device is changed, and wherein the controller is configured to execute a changing process of changing the setting information stored in the storing part when the information regarding setting change of the setting information from the information displaying device.

6. The information processing device according to claim 1,
wherein the setting information is stored in the information displaying device, and
wherein, in the generating process, the displaying data is generated such that the setting information transmitted from the information displaying device is received, and a default displaying form of the displaying information is one of the first displaying form and the second displaying form.

7. The information processing device according to claim 1,
wherein the setting information is stored in the information displaying device,
wherein the displaying data including a display controlling script to be executed by the information displaying device when the displaying information is displayed is generated in the generating process, and
wherein the display controlling script includes script controlling the information displaying device such that the information displaying device displays the displaying information in accordance with one of the first displaying form and the second displaying form according to the setting information stored in the information displaying device.

8. An information providing method for an image providing device including a controller and a communicating part,
wherein the information providing method is to be performed by the controller,
wherein the information providing method comprising:
generating displaying data used by an information displaying device to display displaying information; and
transmitting the displaying data as generated to the information displaying device through the communicating part,
wherein, when the displaying data is generated, the displaying data is generated such that a displaying form of the displaying information displayed by the information displaying device is switchable between a first displaying form and a second displaying form, and a default displaying form of the displaying information is set to one of the first form and the second form in accordance with setting information arbitrarily set by a user,
wherein the first displaying form is configured such that a content area is displayed and a menu area is not displayed, the menu area including a plurality of items, the content area including contents corresponding to at least one of the plurality of items, and
wherein the second displaying form is configured such that both the menu area and the content area are displayed.

9. A non-transitory computer-readable recording medium for an information providing device having a controller a communicating part,
wherein the recording medium stores instructions which cause, when executed by the controller, the information providing device to perform:
a generating process of generating displaying data used by an information displaying device to display displaying information; and
a transmitting process of transmitting the displaying data generated in the generating process to the information displaying device through the communicating part,
wherein, in the generating process, the controller is configured to generate the displaying data so that a displaying form of the displaying information displayed by the information displaying device is switchable between a first displaying form and a second displaying form, and a default displaying form of the displaying information is set to one of the first form and the second form in accordance with setting information arbitrarily set by a user,
wherein the first displaying form is configured such that a content area is displayed and a menu area is not displayed, the menu area including a plurality of items, the content area including contents corresponding to at least one of the plurality of items, and
wherein the second displaying form is configured such that both the menu area and the content area are displayed.

10. An information displaying device, comprising:
a controller;
a communicating part; and
a displaying part,
wherein the controller is configured to perform:
a receiving process of receiving displaying data used to display displaying information through the communicating part; and
a displaying process of displaying the displaying information on the displaying part based on the displaying data received in the receiving process,
wherein, in the displaying process, the controller displays the displaying information which is configured such that a displaying form of the displaying information displayed by the information displaying device is switchable between a first displaying form and a second displaying form, and a default displaying form of the displaying information is set to one of the first form and the second form in accordance with setting information arbitrarily set by a user,
wherein the first displaying form is configured such that a content area is displayed and a menu area is not displayed, the menu area including a plurality of items, the content area including contents corresponding to at least one of the plurality of items, and wherein the second displaying form is configured such that both the menu area and the content area are displayed.

* * * * *